United States Patent
Bultje et al.

(10) Patent No.: US 12,126,811 B2
(45) Date of Patent: *Oct. 22, 2024

(54) ENCODING AND DECODING USING TILING

(71) Applicant: GOOGLE LLC, Mountain View, CA (US)

(72) Inventors: Ronald Sebastiaan Bultje, San Jose, CA (US); Sami Aleksi Pietilä, Oulu (FI)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,024

(22) Filed: Jun. 27, 2023

(65) Prior Publication Data

US 2023/0353752 A1    Nov. 2, 2023

Related U.S. Application Data

(63) Continuation of application No. 17/867,920, filed on Jul. 19, 2022, now Pat. No. 11,722,676, which is a
(Continued)

(51) Int. Cl.
*H04N 19/176* (2014.01)
*H04N 19/119* (2014.01)
(Continued)

(52) U.S. Cl.
CPC ......... *H04N 19/152* (2014.11); *H04N 19/119* (2014.11); *H04N 19/174* (2014.11); *H04N 19/436* (2014.11)

(58) Field of Classification Search
CPC .. H04N 19/119; H04N 19/152; H04N 19/174; H04N 19/436
See application file for complete search history.

(56) References Cited

U.S. PATENT DOCUMENTS

| 3,825,832 A | 7/1974 | Frei et al. |
| 4,719,642 A | 1/1988 | Lucas |

(Continued)

FOREIGN PATENT DOCUMENTS

| JP | 2007-166625 A | 6/2007 |
| WO | 2008/020470 A1 | 2/2008 |

(Continued)

OTHER PUBLICATIONS

Wiegand et al., "Overview of the H 264/AVC Video Coding Standard," IEEE Transactions on Circuits and Systems for Video Technology, vol. 13, No. 7, pp. 568, 569, Jul. 1, 2003.

(Continued)

*Primary Examiner* — James T Boylan
(74) *Attorney, Agent, or Firm* — Young Basile Hanlon & MacFarlane, P.C.

(57) ABSTRACT

Video coding using tiling may include encoding a current frame by identifying a tile-width for encoding a current tile of the current frame, the tile-width indicating a cardinality of horizontally adjacent blocks in the current tile, identifying a tile-height for encoding the current tile of the current frame, the tile-height indicating a cardinality of vertically adjacent block in the current tile, and generating an encoded tile by encoding the current tile, such that a row of the current tile includes tile-width horizontally adjacent blocks from the plurality of blocks, and a column of the current tile includes tile-height vertically adjacent blocks from the plurality of blocks. Encoding the current frame may include outputting the encoded tile, wherein outputting the encoded tile includes including an encoded-tile size in an output bitstream, the encoded-tile size indicating a cardinality of bytes for including the encoded tile in the output bitstream.

10 Claims, 8 Drawing Sheets

Related U.S. Application Data continuation of application No. 16/239,633, filed on Jan. 4, 2019, now Pat. No. 11,425,395, which is a continuation of application No. 13/971,123, filed on Aug. 20, 2013, now abandoned.

(51) Int. Cl.
*H04N 19/152* (2014.01)
*H04N 19/174* (2014.01)
*H04N 19/436* (2014.01)

(56) References Cited

U.S. PATENT DOCUMENTS

| | | |
|---|---|---|
| 4,729,127 A | 3/1988 | Chan et al. |
| 4,736,446 A | 4/1988 | Reynolds et al. |
| 4,868,764 A | 9/1989 | Richards |
| 4,891,748 A | 1/1990 | Mann |
| 5,068,724 A | 11/1991 | Krause et al. |
| 5,083,214 A | 1/1992 | Knowles |
| 5,091,782 A | 2/1992 | Krause et al. |
| 5,136,371 A | 8/1992 | Savatier et al. |
| 5,136,376 A | 8/1992 | Yagasaki et al. |
| 5,138,447 A | 8/1992 | Shen et al. |
| 5,164,819 A | 11/1992 | Music |
| 5,270,812 A | 12/1993 | Richards |
| 5,274,442 A | 12/1993 | Murakami et al. |
| 5,313,306 A | 5/1994 | Kuban et al. |
| 5,341,440 A | 8/1994 | Earl et al. |
| 5,381,145 A | 1/1995 | Allen et al. |
| 5,432,870 A | 7/1995 | Schwartz |
| 5,452,006 A | 9/1995 | Auld |
| 5,471,248 A | 11/1995 | Bhargava et al. |
| 5,510,842 A | 4/1996 | Phillips et al. |
| 5,532,744 A | 7/1996 | Akiwumi-Assani et al. |
| 5,561,477 A | 10/1996 | Polit |
| 5,576,765 A | 11/1996 | Cheney et al. |
| 5,576,767 A | 11/1996 | Lee et al. |
| 5,589,945 A | 12/1996 | Abecassis |
| 5,659,539 A | 8/1997 | Porter et al. |
| 5,696,869 A | 12/1997 | Abecassis |
| 5,734,744 A | 3/1998 | Wittenstein et al. |
| 5,737,020 A | 4/1998 | Hall et al. |
| 5,748,247 A | 5/1998 | Hu |
| 5,774,593 A | 6/1998 | Zick et al. |
| 5,793,647 A | 8/1998 | Hageniers et al. |
| 5,818,969 A | 10/1998 | Astle |
| 5,828,370 A | 10/1998 | Moeller et al. |
| 5,835,144 A | 11/1998 | Matsumura et al. |
| 5,883,671 A | 3/1999 | Keng et al. |
| 5,903,264 A | 5/1999 | Moeller et al. |
| 5,929,940 A | 7/1999 | Jeannin |
| 5,930,493 A | 7/1999 | Ottesen et al. |
| 5,963,203 A | 10/1999 | Goldberg et al. |
| 5,999,641 A | 12/1999 | Miller et al. |
| 6,014,706 A | 1/2000 | Cannon et al. |
| 6,041,145 A | 3/2000 | Hayashi et al. |
| 6,061,397 A | 5/2000 | Ogura |
| 6,084,908 A | 7/2000 | Chiang et al. |
| 6,108,383 A | 8/2000 | Miller et al. |
| 6,112,234 A | 8/2000 | Leiper |
| 6,115,501 A | 9/2000 | Chun et al. |
| 6,119,154 A | 9/2000 | Weaver et al. |
| 6,125,144 A | 9/2000 | Matsumura et al. |
| 6,141,381 A | 10/2000 | Sugiyama |
| 6,167,164 A | 12/2000 | Lee |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,240,135 B1 | 5/2001 | Kim |
| 6,263,023 B1 | 7/2001 | Ngai |
| 6,292,837 B1 | 9/2001 | Miller et al. |
| 6,327,304 B1 | 12/2001 | Miller et al. |
| 6,370,267 B1 | 4/2002 | Miller et al. |
| 6,400,763 B1 | 6/2002 | Wee |
| 6,414,995 B2 | 7/2002 | Okumura et al. |
| 6,418,166 B1 | 7/2002 | Wu et al. |
| 6,522,784 B1 | 2/2003 | Zlotnick |
| 6,529,638 B1 | 3/2003 | Westerman |
| 6,560,366 B1 | 5/2003 | Wilkins |
| 6,687,303 B1 | 2/2004 | Ishihara |
| 6,697,061 B1 | 2/2004 | Wee et al. |
| 6,707,952 B1 | 3/2004 | Tan et al. |
| 6,765,964 B1 | 7/2004 | Conklin |
| 6,826,229 B2 | 11/2004 | Kawashima et al. |
| 6,934,419 B2 | 8/2005 | Zlotnick |
| 6,985,526 B2 | 1/2006 | Bottreau et al. |
| 6,987,866 B2 | 1/2006 | Hu |
| 7,027,654 B1 | 4/2006 | Ameres et al. |
| 7,027,665 B1 | 4/2006 | Kagle et al. |
| 7,116,831 B2 | 10/2006 | Mukerjee et al. |
| 7,170,937 B2 | 1/2007 | Zhou |
| 7,226,150 B2 | 6/2007 | Yoshimura et al. |
| 7,227,589 B1 | 6/2007 | Yeo et al. |
| 7,236,524 B2 | 6/2007 | Sun et al. |
| 7,302,001 B2 | 11/2007 | Wang et al. |
| 7,330,509 B2 | 2/2008 | Lu et al. |
| 7,460,725 B2 | 12/2008 | Malladi et al. |
| 7,499,492 B1 | 3/2009 | Ameres et al. |
| 7,535,474 B1* | 5/2009 | Scholander ............ G09G 5/39 345/531 |
| 7,606,310 B1 | 10/2009 | Ameres et al. |
| 7,627,039 B2 | 12/2009 | Lillevold |
| 7,636,467 B2 | 12/2009 | Burian et al. |
| 7,760,802 B2 | 7/2010 | Wang et al. |
| 7,885,334 B2 | 2/2011 | Muller et al. |
| 7,949,054 B2 | 5/2011 | Tu et al. |
| 8,036,280 B2 | 10/2011 | Kim et al. |
| 8,160,148 B2 | 4/2012 | Booth et al. |
| 9,584,819 B2 | 2/2017 | Wang et al. |
| 9,699,465 B2 | 7/2017 | Ouedraogo et al. |
| 9,749,661 B2 | 8/2017 | Wang et al. |
| 11,425,395 B2* | 8/2022 | Bultje ................ H04N 19/174 |
| 11,722,676 B2* | 8/2023 | Bultje ................ H04N 19/174 375/240.24 |
| 2002/0031184 A1 | 3/2002 | Iwata |
| 2002/0168114 A1 | 11/2002 | Valente |
| 2003/0023982 A1 | 1/2003 | Lee et al. |
| 2003/0189982 A1 | 10/2003 | MacInnis |
| 2003/0215018 A1 | 11/2003 | MacInnis et al. |
| 2004/0120400 A1 | 6/2004 | Linzer |
| 2004/0228410 A1 | 11/2004 | Ameres et al. |
| 2004/0240556 A1 | 12/2004 | Winger et al. |
| 2004/0258151 A1 | 12/2004 | Spampinato |
| 2005/0147165 A1 | 7/2005 | Yoo et al. |
| 2005/0169374 A1 | 8/2005 | Marpe et al. |
| 2005/0265447 A1 | 12/2005 | Park |
| 2005/0265461 A1 | 12/2005 | Raveendran |
| 2005/0276323 A1 | 12/2005 | Martemyanov et al. |
| 2006/0098737 A1 | 5/2006 | Sethuraman et al. |
| 2006/0215758 A1 | 9/2006 | Kawashima |
| 2006/0239345 A1 | 10/2006 | Taubman et al. |
| 2007/0025441 A1 | 2/2007 | Ugur et al. |
| 2007/0086528 A1 | 4/2007 | Mauchly et al. |
| 2007/0140342 A1 | 6/2007 | Karczewicz et al. |
| 2007/0286288 A1 | 12/2007 | Smith et al. |
| 2008/0152014 A1 | 6/2008 | Schreier et al. |
| 2008/0159407 A1 | 7/2008 | Yang et al. |
| 2008/0212678 A1 | 9/2008 | Booth et al. |
| 2009/0003714 A1* | 1/2009 | Subramaniam ...... H04N 19/184 375/E7.184 |
| 2012/0230428 A1 | 9/2012 | Segall et al. |
| 2013/0101035 A1* | 4/2013 | Wang .................. H04N 19/174 375/E7.243 |
| 2013/0182775 A1* | 7/2013 | Wang .................. H04N 19/90 375/240.24 |
| 2013/0308709 A1* | 11/2013 | Norkin .................. H04N 19/17 375/240.01 |
| 2014/0003525 A1* | 1/2014 | Fuldseth ................ H04N 19/44 375/240.16 |
| 2014/0119671 A1* | 5/2014 | Lim ...................... H04N 19/176 382/233 |
| 2014/0247875 A1* | 9/2014 | Hattori .................. H04N 19/86 375/240.12 |

(56) References Cited

U.S. PATENT DOCUMENTS

| | | | |
|---|---|---|---|
| 2014/0307775 A1 | 10/2014 | Ouedraogo et al. | |
| 2015/0003520 A1* | 1/2015 | Mody ............... | H04N 19/436 |
| | | | 375/240.08 |
| 2017/0314920 A1 | 11/2017 | Yamada et al. | |

FOREIGN PATENT DOCUMENTS

| | | |
|---|---|---|
| WO | 2008/036237 A2 | 3/2008 |
| WO | 2010/063184 A1 | 6/2010 |

OTHER PUBLICATIONS

Li E Q et al., "Implementation of H.264 encoder on general-purpose processors with hyper-threading technology", Proceedings of SPIE, pp. 384-395, vol. 5308, No. 1, Jan. 20, 2004.

Sharp, "Entropy slices for parallel entropy decoding", ITU-T SG16 Meeting, Apr. 22, 2008-Feb. 5, 2008, Geneva.

Sze, "Massively Parallel Cabac", VCEG meeting, Jan. 7, 2009, London and MPEG meeting, Aug. 7, 2009, Geneva.

Bankoski et al. "Technical Overview of VP8, an Open Source Video Codec for the Web". Dated Jul. 11, 2011.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Sikora, T. et al., Shape-adaptive OCT for generic coding of video, Circuits and Systems for Video Technology, IEEE Transactions on vol. 5, Issue 1, p. 59-62, Feb. 1, 1995.

PCT International Search Report and Written Opinion (Date of Mailing: Mar. 26, 2010); PCT/US2009/0564 73, filed Sep. 10, 2009.

"Overview; VP? Data Format and Decoder". Version 1.5. On2 Technologies, Inc. Dated Mar. 28, 2005.

"Series H: Audiovisual and Multimedia Systems; Infrastructure of audiovisual services—Coding of moving video". H.264. Advanced video coding for generic audiovisual services. Version 8. International Telecommunication Union. Dated Nov. 2007.

Supplemental European Search Report for corresponding European Application No. 09813587.4 mailed Jul. 24, 2012 in 10 pages.

T. Chen, Y.H. Ng; Lossless Color Image Compression Technique for Multimedia Applications; IBM Technical Disclosure Bulletin; vol. 37 No. 10, Oct. 1994.

Method for the encoding of a compressed video sequence derived from the same video sequence compressed at a different bit rate without loss of data.

Rajasvaran Logeswaran; A Prediction-Based Neural Network Scheme for Lossless Data Compression; Multimedia University, Malaysia.

ON2 Technologies, Inc., White Paper TrueMotion VP? Video Codec, Jan. 10, 2005, 13 pages, Document Version: 1.0, Clifton Park, New York.

ON2 Technologies, Inc., White Paper On2's TrueMotion VP? Video Codec, Jul. 11, 2008, pp. 7 pages, Document Version: 1.0, Clifton Park, New York.

Rajan L. Joshi, Thomas R. Fischer, Roberto H. Bamberger; Lossy Encoding of Motion Vectors Using Entropy-Constrained Vector Quantization; School of Electrical Engineering and Computer Science Washington State University, Pullman WA.

Armando J. Pinho; Encoding of Image Partitions, Using a Standard Technique for Lossless Image Compression; Dep. Electronica e Telecomunicacoes/ INESC Universidade de Aveiro, Portugal.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

* cited by examiner

ENCODING AND DECODING USING TILING

CROSS-REFERENCE TO RELATED APPLICATIONS

This application is a continuation of U.S. patent application Ser. No. 17/867,920, filed Jul. 19, 2022, which is a continuation of U.S. patent application Ser. No. 16/239,633, filed Jan. 4, 2019, which is a continuation of U.S. patent application Ser. No. 13/971,123, filed Aug. 20, 2013, which are incorporated herein in the entirety by reference.

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide encoding and decoding using tiling.

SUMMARY

This application relates to encoding and decoding of video stream data for transmission or storage. Disclosed herein are aspects of systems, methods, and apparatuses for encoding and decoding using tiling.

An aspect is an apparatus for encoding using tiling which may include a memory storing instructions for decoding using tiling, and a processor that executes the instructions to encode a video stream including a plurality of frames. To encode the video stream the processor executes the instructions to identify a current frame from the plurality of frames, wherein the current frame includes a plurality of blocks, and wherein the current frame has a frame-width indicating a cardinality of horizontally adjacent blocks in the current frame, and a frame-height indicating a cardinality of vertically adjacent blocks in the current frame and encode the current frame. To encode the current frame, the processor executes the instructions to identify a tile-width for encoding a current tile of the current frame, the tile-width indicating a cardinality of horizontally adjacent blocks in the current tile, identify a tile-height for encoding the current tile of the current frame, the tile-height indicating a cardinality of vertically adjacent block in the current tile, and generate an encoded tile, wherein, to generate the encoded tile, the processor executes the instructions to encode the current tile, such that a row of the current tile includes tile-width horizontally adjacent blocks from the plurality of blocks, and a column of the current tile includes tile-height vertically adjacent blocks from the plurality of blocks. To encode the video stream the processor executes the instructions to output the encoded tile, wherein, to output the encoded tile, the processor executes the instructions to include an encoded-tile size in an output bitstream, the encoded-tile size indicating a cardinality of bytes for including the encoded tile in the output bitstream.

Another aspect is an apparatus for decoding using tiling which may include a memory storing instructions for decoding using tiling, and a processor that executes the instructions to decode an encoded video stream. To decode the encoded video stream, the processor executes the instructions to receive at least a portion of the encoded video stream, identify at least a portion of a current frame from the encoded video stream, wherein to identify the portion of the current frame, the processor executes the instructions to identify a frame-width indicating a cardinality of horizontally adjacent blocks in the current frame, and a frame-height indicating a cardinality of vertically adjacent blocks in the current frame, and decode the current frame. To decode the current frame, the processor executes the instructions to obtain an encoded-tile size from the encoded video stream, the encoded-tile size indicating a cardinality of bytes for the encoded tile in the encoded video stream, obtain encoded tile data for a current tile based on the encoded-tile size, identify a tile-width for decoding the current tile, the tile-width indicating a cardinality of horizontally adjacent blocks in the current tile, identify a tile-height for decoding the current tile, the tile-height indicating a cardinality of vertically adjacent block in the current tile, and generate a decoded tile, wherein to generate the decoded tile, the processor executes the instructions to decode the current tile, such that a row of the decoded tile includes tile-width horizontally adjacent blocks, and a column of the decoded tile includes tile-height vertically adjacent blocks. To decode the encoded video stream, the processor executes the instructions to output the decoded tile.

Another aspect is a non-transitory computer-readable storage medium, comprising executable instructions that, when executed by a processor, facilitate performance of operations, including decoding an encoded video stream. Decoding the encoded video stream includes receiving at least a portion of the encoded video stream, identifying at least a portion of a current frame from the encoded video stream, wherein identifying the portion of the current frame includes identifying a frame-width indicating a cardinality of horizontally adjacent blocks in the current frame, and a frame-height indicating a cardinality of vertically adjacent blocks in the current frame, decoding the current frame by obtaining an encoded-tile size from the encoded video stream, the encoded-tile size indicating a cardinality of bytes for the encoded tile in the encoded video stream, obtaining encoded tile data for a current tile based on the encoded-tile size, identifying a tile-width for decoding the current tile, the tile-width indicating a cardinality of horizontally adjacent blocks in the current tile, identifying a tile-height for decoding the current tile, the tile-height indicating a cardinality of vertically adjacent block in the current tile, and generating a decoded tile by decoding the current tile, such that a row of the decoded tile includes tile-width horizontally adjacent blocks, and a column of the decoded tile includes tile-height vertically adjacent blocks. Decoding the encoded video stream includes outputting the decoded tile.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video may be used for various purposes including, for example, remote business meetings via video conferencing, high definition video entertainment, video advertisements, and sharing of user-generated videos. Digital video streams may represent video using a sequence of frames or images. Each frame can include a number of blocks, which may include information indicating pixel attributes, such as color values or brightness. Transmission and storage of video can use significant computing or communications resources. Compression and other coding techniques may be used to reduce the amount of data in video streams. However, the benefits of coding may be limited by the availability of resources, and the loss or corruption of some data may affect the coding of other data.

For example, coding techniques such as partitioning may reduce decoding time through parallelism; however, partitions may be dependent such that corruption or loss of one partition may affect the decoding of other partitions. Partitioning may include synchronizing the rows of a video frame at each block based on contextual dependencies between the blocks. The reduction in decoding time for coding using partitioning may be relatively small. For example, the reduction in decoding time for two threads may be approximately 10%; the reduction in decoding time for four threads may be approximately 20% over single threaded decoding; and the reduction in decoding time for eight threads may be similar to the reduction using four threads. In contrast, frame threading may reduce decoding time by approximately 35-40% for two threads, 60-65% for four threads, and 75% for eight threads. Frame threading may scale more efficiently than partitioning.

In some implementations, coding can include encoding and decoding using tiling to improve error resilience and parallelism and reduce resource utilization and latency. Encoding and decoding using tiling may include column-tiling a frame, such that each tile includes tile-width by frame-height blocks, row-tiling the frame, such that each tile includes frame-width by tile-height blocks, or row-and-column-tiling the frame, such that each tile includes tile-width by tile-height blocks. Column-tiling may improve error resilience and parallelism and may utilize fewer resources. Each column-tile may be coded independently of other tiles. Row-tiling may improve error resilience, through independence, and may reduce latency. Row-tiles may be coded independently of other tiles, or may be include dependencies.

Figure 1:
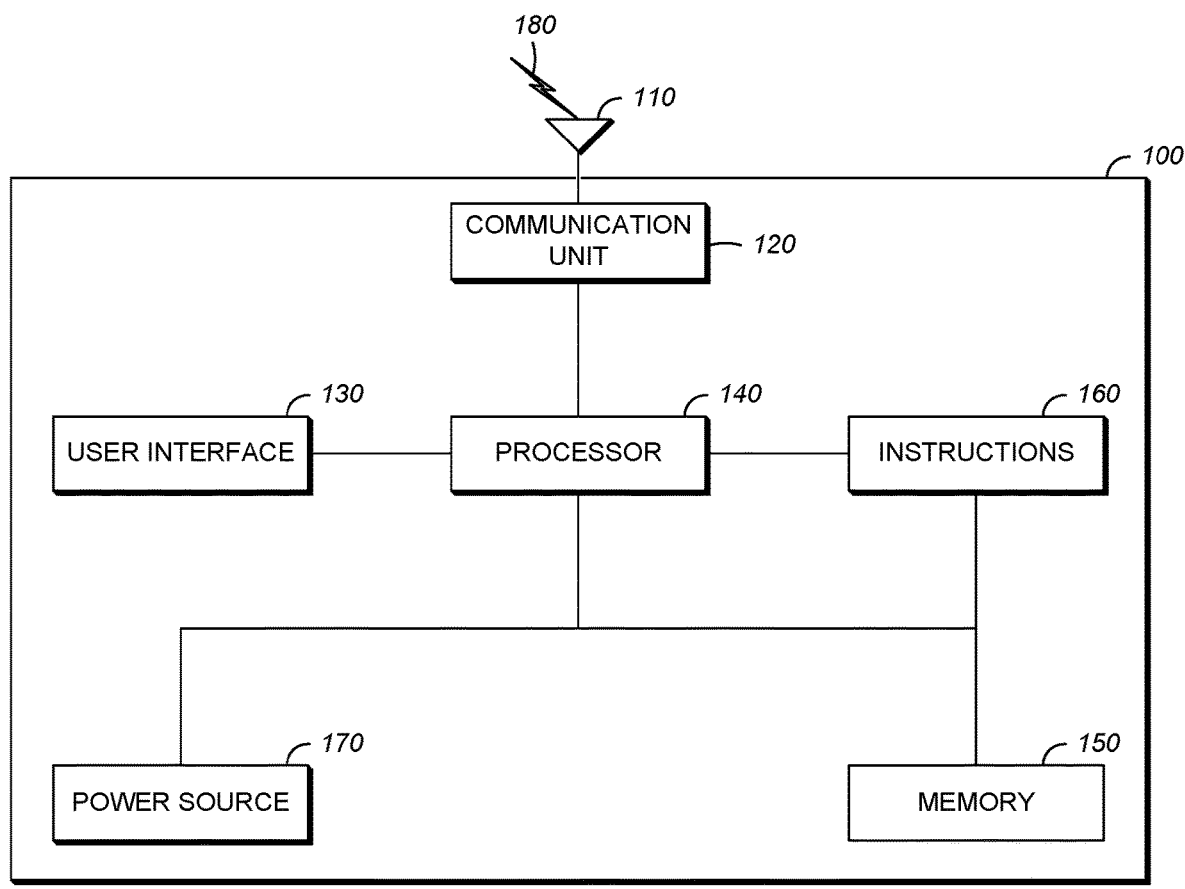
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
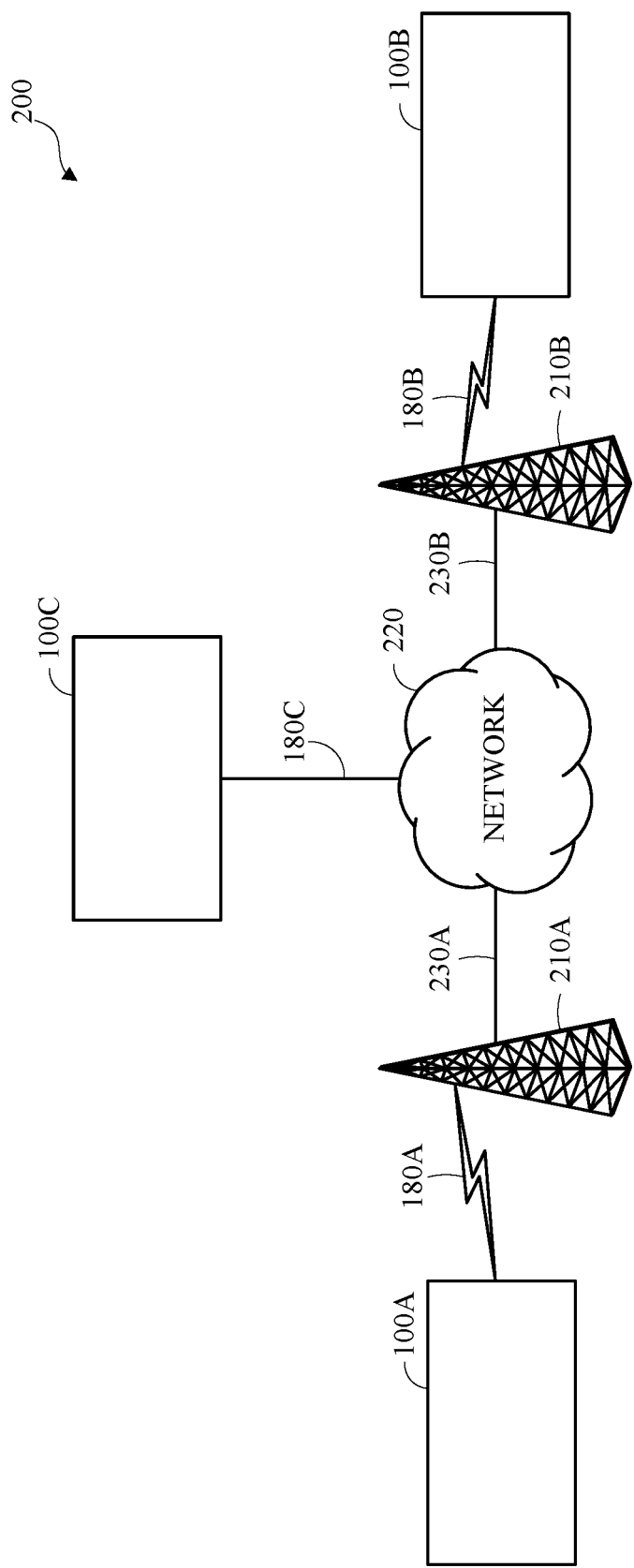
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
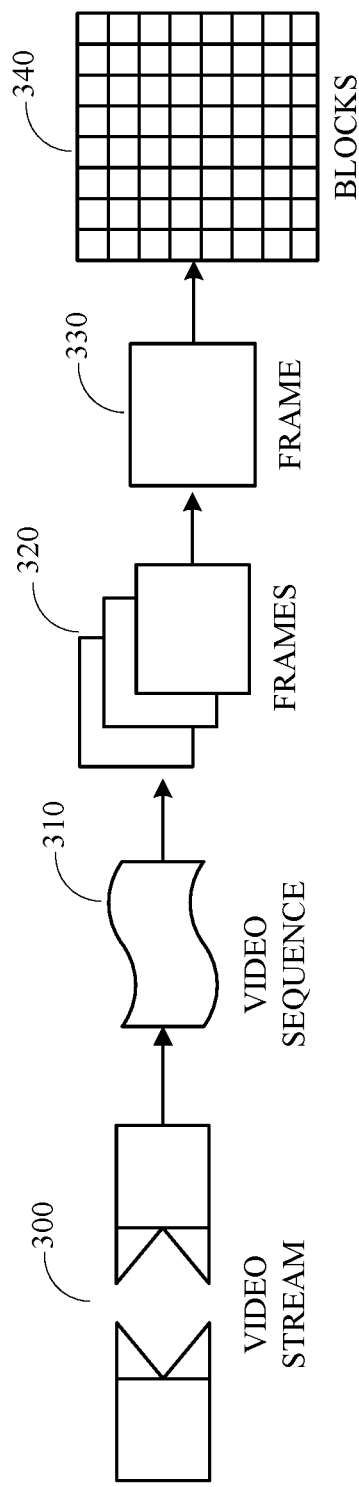
FIG. 3 is a diagram of a video stream for use in frame interpolation in accordance with implementations of this disclosure.

FIG. 3 is a diagram of a video stream 300 for use in encoding, decoding, frame interpolation, or any combination thereof, in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
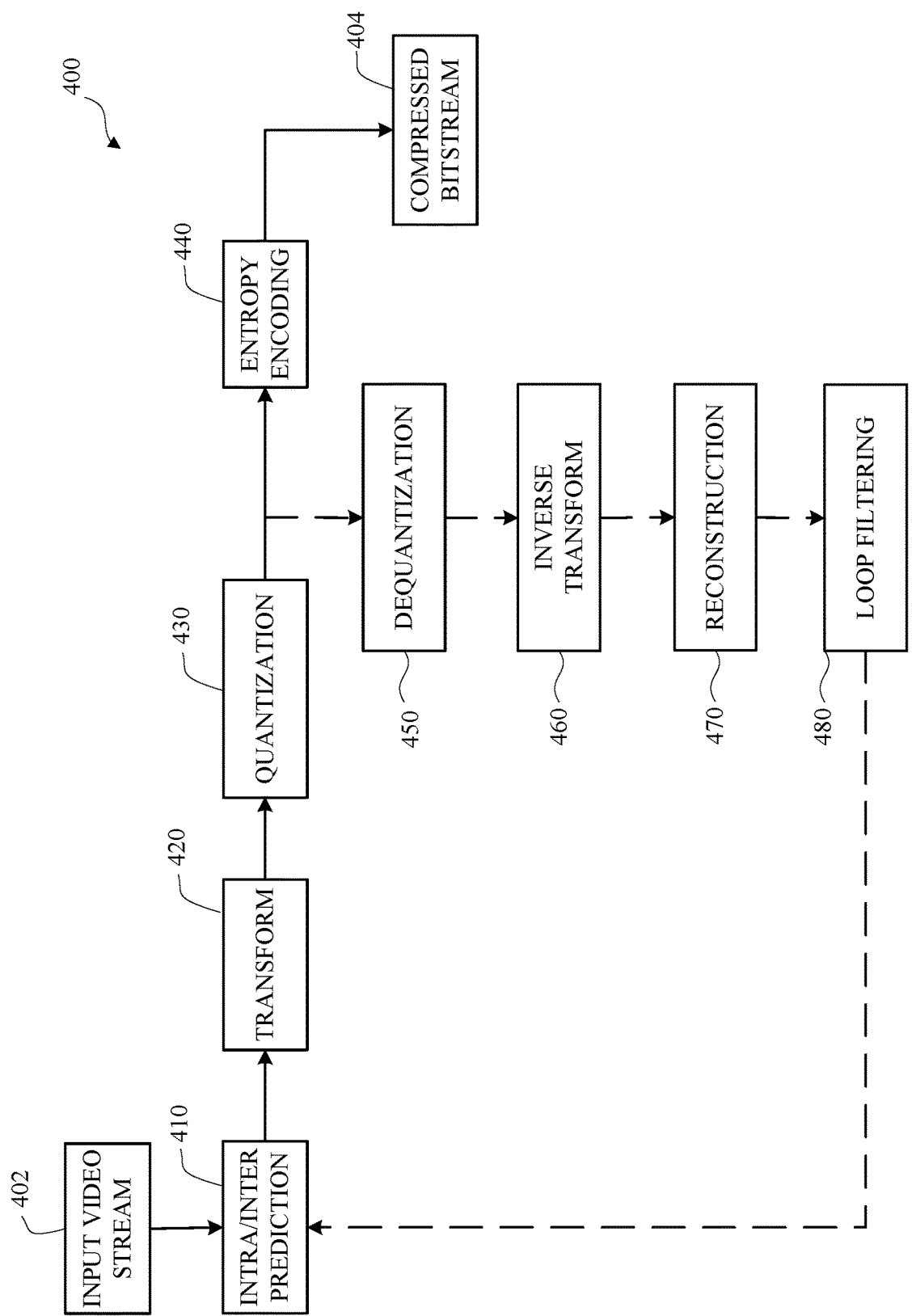
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loeve Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
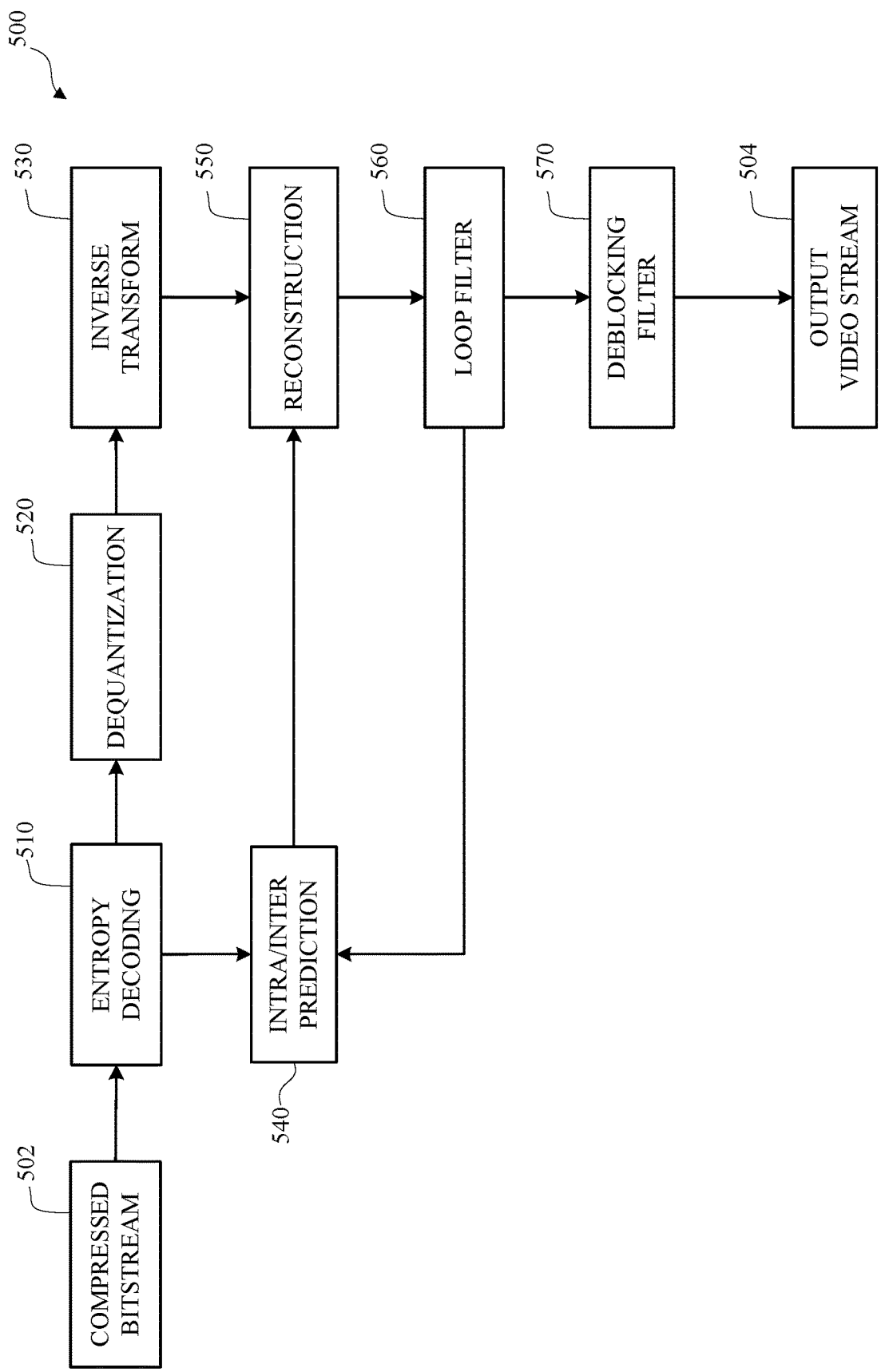
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
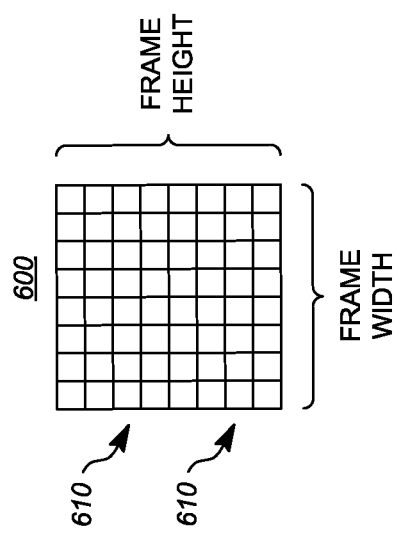
FIG. 6 shows an example of a frame in accordance with implementations of this disclosure.

FIG. 6 shows an example of a frame 600 in accordance with implementations of this disclosure. In some implementations, a frame 600, such as the frame 340 shown in FIG. 3, may include blocks 610. For example, the frame 600 may include a two dimensional 8×8 matrix of blocks 610 as shown, a 16×16 matrix of blocks, a 64×64 matrix of blocks, or any other matrix or configuration of blocks capable of representing an image of a video sequence. In some implementations, the frame 600 may be arranged as a matrix having rows and columns of blocks 610 as shown. The number, or cardinality, of blocks in a row may be referred to as the frame-width. The number, or cardinality, of blocks in a column may be referred to as the frame-height. For example, the frame 600 shown in FIG. 6 has a frame-width of eight, indicating a cardinality of eight horizontally adjacent blocks per frame row, and a frame-height of eight, indicating a cardinality of eight vertically adjacent blocks per frame column.

Although not shown in FIG. 6, a block 610 can include pixels. For example, a block can include a 16×16 group of pixels, an 8×8 group of pixels, an 8×16 group of pixels, or any other group of pixels. In some implementations, the block 610 may be arranged as a matrix having rows and columns of pixels. The number, or cardinality, of pixels in a row may be referred to as the block-width. The number, or cardinality, of pixels in a column may be referred to as the block-height.

Figure 7:
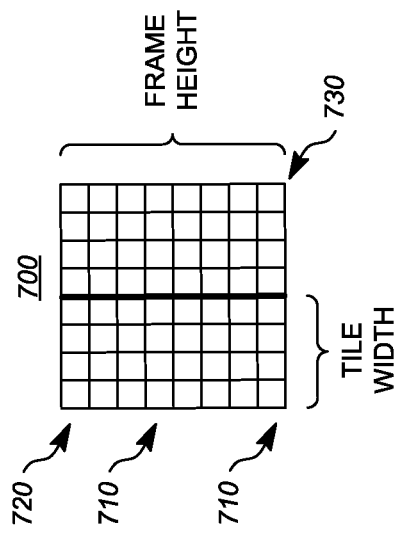
FIG. 7 shows an example of a column-tiled frame in accordance with implementations of this disclosure.
Figure 9:
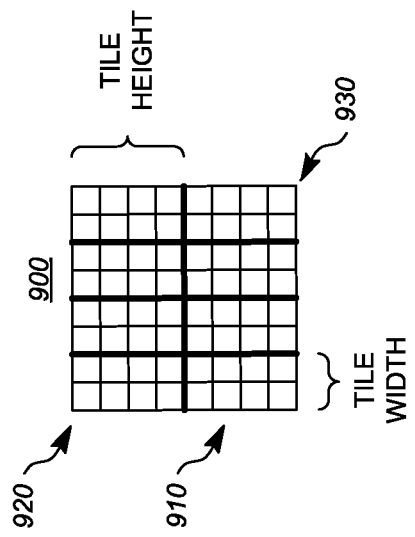
FIG. 9 shows an example a row-and-column-tiled frame in accordance with implementations of this disclosure.
Figure 8:
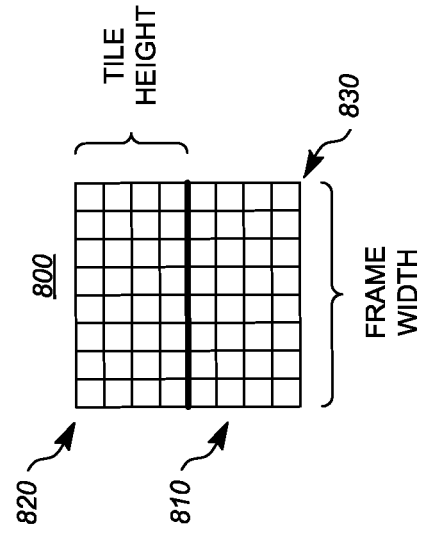
FIG. 8 shows an example of a row-tiled frame in accordance with implementations of this disclosure.

In some implementations, tiling may include organizing a frame into sub-sections, or tiles. For example, a frame may be column-tiled, as shown in FIG. 7, row-tiled, as shown in FIG. 8, or may be organized using a combination of column-tiling and row-tiling as shown in FIG. 9.

In some implementations, tiling may improve error resilience for storing or transmitting a video sequence. For example, each tile may be encoded and decoded independently of each other tile, and a lost or corrupt tile, such as a tile that is partially or completely lost or corrupted during transmission over a lossy network connection, such as a UDP network connection, may not effect decoding of other tiles.

In some implementations, tiling may improve parallelism for encoding and decoding a video sequence. For example, each tile may be encoded and decoded independently of each other tile and multiple tiles may be encoded or decoded in parallel, using, for example, multiple processors, multiple encoders, multiple cores, or a combination thereof. Parallel processing may increase encoding or decoding speed.

In some implementations, tiling may reduce hardware utilization. For example, a video frame may be decoded block-by-block, and may use temporary storage buffers of block-height by frame-width to buffer decoded results. The video frame may be 16000 pixels wide, may have a block size of 64×64 pixels, each pixel may utilize one byte of storage, and decoding the frame may utilize 64×16000 bytes, or 1 MB, of temporary memory to store the blocks for reconstruction. A column-tiled frame, which may have a maximum tile-width, may be decoded independently of other tiles, which may include utilizing block-height by tile-width memory to buffer decoded results. For example, the tiles may be 4000 pixels wide, and decoding a tile may utilize 64×4000, or 256 kB of buffer. Utilizing fewer memory buffer resources may reduce hardware costs.

In some implementations, tiling may reduce latency. For example, one or more encoded tiles in a frame may be transmitted or stored concurrently with encoding of other tiles in the frame. In an example, a video stream may be encoded and transmitted for real-time communications via a rate-limited bandwidth transmission medium at 25 fps and 40 ms transfer time per frame. Transmitting one or more encoded tiles concurrently with encoding other tiles in a frame may reduce latency by (n_rows−1)×40 ms/n_rows. For example, for two rows, latency may be reduced by 20 ms, and for four rows, latency may be reduced by 30 ms.

FIG. 7 shows an example of a column-tiled frame 700 in accordance with implementations of this disclosure. The column-tiled frame 700 may be similar to the frame 600 shown in FIG. 6, except that the column-tiled frame 700 may include column-tiles 720/730. The number, or cardinality, of blocks 710 in a row of a column-tile may be referred to as the tile-width. The number, or cardinality, of blocks 710 in a column of a column-tile may be the frame-height. For example, the column-tiles 720/730 shown in FIG. 7 may each have a tile-width of four, indicating a cardinality of four horizontally adjacent blocks 710 per tile row, and a frame-height of eight, indicating a cardinality of eight vertically adjacent blocks 710 per tile column.

FIG. 8 shows an example of a row-tiled frame 800 in accordance with implementations of this disclosure. The row-tiled frame 800 may be similar to the frame 600 shown in FIG. 6, except that the row-tiled frame 800 may include row-tiles 820/830. The number, or cardinality, of blocks 810 in a column of a row-tile may be referred to as the tile-height. The number, or cardinality, of blocks 810 in a row of a row-tile may be the frame-width. For example, the row-tiles 820/830 shown in FIG. 8 may each have a tile-height of four, indicating a cardinality of four vertically adjacent blocks 810 per tile column, and a frame-width of eight, indicating a cardinality of eight horizontally adjacent blocks 810 per tile row.

FIG. 9 shows an example a row-and-column-tiled frame 900 in accordance with implementations of this disclosure. The row-and-column-tiled frame 900 may be similar to the frame 600 shown in FIG. 6, except that the row-and-column-tiled frame 900 may include row-and-column-tiles 920/930. The number, or cardinality, of blocks 910 in a column of a row-and-column-tile may be referred to as the tile-height. The number, or cardinality, of blocks 910 in a row of a row-and-column-tile may be referred to as the tile-width. For example, the row-and-column-tiles 920/930 shown in FIG. 9 may each have a tile-height of four, indicating a cardinality of four vertically adjacent blocks 910 per tile column, and a tile-width of two, indicating a cardinality of two horizontally adjacent blocks 910 per tile row.

Figure 10:
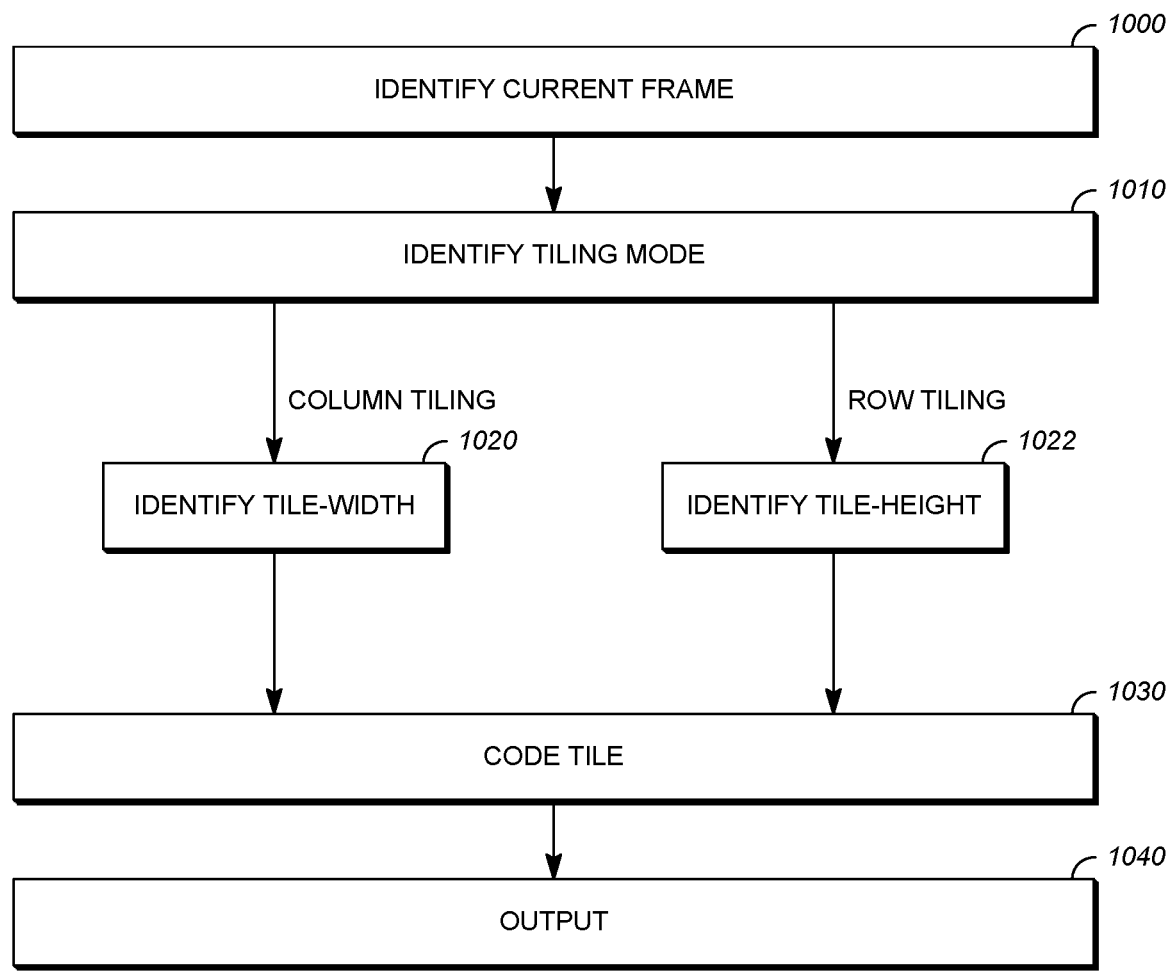
FIG. 10 shows an example of encoding using tiling in accordance with implementations of this disclosure.

FIG. 10 shows an example of encoding using tiling in accordance with implementations of this disclosure. In some implementations, encoding using tiling may be implemented in an encoder, such as the encoder 400 shown in FIG. 4. In some implementations, encoding using tiling may include identifying a current frame at 1000, identifying a tiling mode at 1010, identifying a tile-width at 1020, identifying a tile-height at 1022, encoding a tile at 1030, outputting the tile at 1040, or any combination thereof.

In some implementations, a current frame of an input video sequence may be identified at 1000. Identifying a current frame, such as the frame 330 shown in FIG. 3, for encoding the input video sequence may include identifying an input video stream, such as the video stream 300 shown in FIG. 3.

In some implementations a tiling mode may be identified at 1010. A frame may be column-tile, row-tiled, or row-and-column-tiled. Column-tiling may increase error resilience and parallelism, and may lower memory utilization. Row-tiling increase error resilience and may reduce latency. Row-and-column tiling may increase error resilience and parallelism, and may reduce memory utilization and latency. In some implementations, a tiling mode may be identified for a plurality of frames or for the video stream.

In some implementations, a tile-width may be identified at 1020. For example, the tiling mode may be column-tiled or row-and-column-tiled and a tile-width may be identified. In some implementations, the tile-width may be 64-pixel aligned. For example, column-tiles may be aligned with 64×64 superblock boundaries. Column-tiles may have a minimum size, such as 256 pixels, and may have a maximum size, such as 4096 pixels. In an example, a frame, or image, of a video stream, may be 16384 pixels wide and may be column-tiled using four column tiles, each tile being 4096 pixels wide, or may be column-tiled using 64 column tiles, each tile being 256 pixels wide.

In some implementations, a tile-height may be identified at 1022. For example, the tiling mode may be row-tiled or row-and-column-tiled and a tile-height may be identified. Row-tiles may be independently or dependently encoded. Independently encoded row-tiles may increase error resilience. Independently or dependently encoded row-tiles may reduce latency. In some implementations, the tile-height may be 64-pixel aligned. For example, row-tiles may be aligned with 64×64 superblock boundaries. Row-tiles may have a minimum size, such as 256 pixels, and may have a maximum size, such as 4096 pixels. In an example, a frame, or image, of a video stream, may be 16384 pixels tall and may be row-tiled using four row tiles, each tile being 4096 pixels tall, or may be row-tiled using 64 row tiles, each tile being 256 pixels tall.

In some implementations, each tile may be independent of each other tile, and multiple tiles can be encoded concurrently without inter-tile synchronization, and loss or corruption of a tile may not affect the decoding of other independent tiles. In some implementations, tile independence, tile size limitations, or both, may be mandatory. In some implementations, the tile-width, tile-height, or both, for a tile in a frame may differ from the tile-width, tile-height, or both for another tile in the frame. For example, the frame-width of a frame may be 384 pixels, the minimum tile-width may be 256 pixels, a first tile may have a tile-width of 256 pixels and a second tile may have a tile-width of 128 pixels. Implementations of coding using tiles can include using any number of tiles, such as 2, 4, 8, 16, 32, or 64 tiles. In some implementations, coding using tiles may include using a defined minimum number of row tiles, such as one, a defined maximum number of row tiles, such as four, or both.

In some implementations, a tile may be encoded at 1030. Encoding a tile may be similar to the encoding shown in FIG. 4, and may include prediction, transformation, quantization, entropy coding, or a combination thereof. In some implementations, a tile may be encoded independently. Independently encoding a tile may include encoding the tile without reference to information associated with another tile, or a block or pixel in another tile, of the current frame. For example, a tile may be encoded without reference to intra prediction information or contextual information used to predict properties, such as coding modes or motion vectors, of a block in another tile of the current frame. In some implementations, independently encoding tiles may include treating each tile as an independent image, without sharing information across tile boarders.

In an example, the left-most block of a second tile in a frame may be encoded without reference to information used for encoding the right-most block in a first tile in the frame. The left-most block of the second tile may be in the center of the frame and may be encoded using, for example, horizontal intra prediction, as if the block were at the left edge of a frame, without reference to reconstructed pixel values of the right-most macroblock of the first tile for prediction. For example, a default value, such as 129, may be used. In some implementations, two or more tiles, from one or more frames, may be concurrently encoded using multiple encoders, processors, cores, or a combination thereof.

In some implementations, the encoded tile may be transmitted or stored at 1040. For example, the encoded tile may be included in an output stream, and the output may be transmitted to another device, such as the decoder 500 shown in FIG. 5, via a wired or wireless communication system, such as the wireless network shown in FIG. 2. In some implementations, a tile may be encoded in an output bitstream as an array of bytes. For example, a tile may be compressed into a bitstream as an array of bytes. A tile size, which may indicate the number of bytes of tile in the array, may be prepended to the tile. The tile size information may be used, for example, to identify and move between tiles, such as for error resilience or parallelism. In some implementations, a tile may be the last tile in a frame and prepending the tile size may be omitted. In some implementations, one or more other tiles or frames may be encoded concurrently with transmitting the encoded tile. In some implementations, identifying a tile-width at 1020, identifying a tile-height at 1022, coding a tile at 1030, or a combination thereof, may be performed for each tile in the current frame, and the encoded tiles may be transmitted and stored at 1040.

In some implementations, transmitting a tiled video stream, via a network, for example, may include transmitting each tile in a respective network packet, or transmitting multiple tiles combined in each network packet. In some implementations, the position of the tile in the frame may be indicated at the transport layer. In some implementations, transmitting a tiled video stream may include concurrently transmitting two or more signals using two or more transmitters.

Encoding using tiling, or any portion thereof, can be implemented in a device, such as the computing and communication devices 100A/100B/100C shown in FIG. 2. For example, an encoder, such as the encoder 400 shown in FIG. 4, can implement encoding using tiling, or any portion thereof, using instruction stored on a tangible, non-transitory, computer readable media, such as memory 150 shown in FIG. 1.

Figure 11:
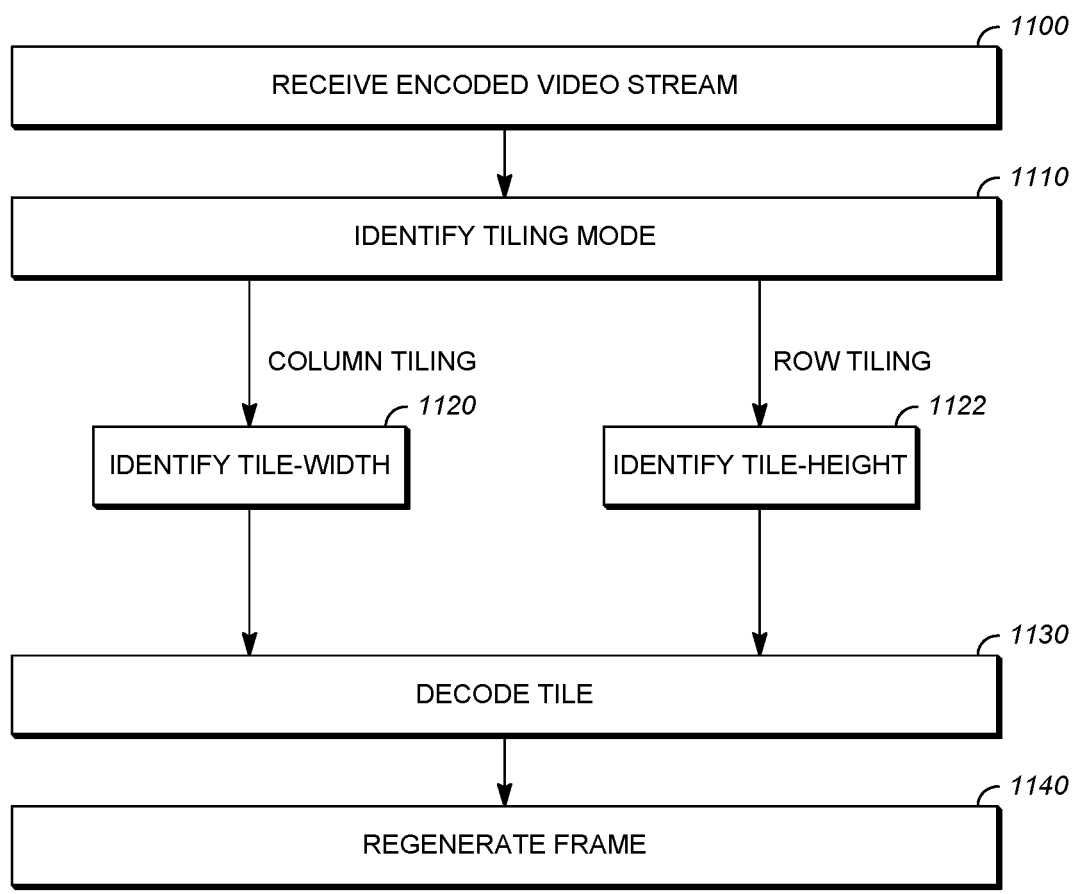
FIG. 11 shows an example of decoding using tiling in accordance with implementations of this disclosure.

FIG. 11 shows an example of decoding using tiling in accordance with implementations of this disclosure. In some implementations, decoding using tiling may be implemented in a decoder, such as the decoder 500 shown in FIG. 5. In some implementations, decoding using tiling may include receiving an encoded video stream at 1100, identifying a tiling mode at 1110, identifying a tile-width at 1120, identifying a tile-height at 1122, decoding a tile at 1130, outputting the tile at 1140, or any combination thereof.

In some implementations, an encoded video signal, such as the compressed bitstream 502 shown in FIG. 5, or a portion thereof, may be received at 1100. For example, receiving the encoded video signal may include receiving a plurality of network packets via a wired or wireless communication system, such as the wireless network shown in FIG. 2. Each network packet may include one or more tiles. In some implementations, the position of the tile in the frame may be indicated at the transport layer. In some implementations, tiles may be decoded out of order or a video stream may be decoded without one or more missing or corrupted tiles. In some implementations, receiving a tiled video stream may include concurrently receiving two or more signals using two or more receivers. Receiving the encoded video signal may include identifying an encoded current frame, or a portion thereof. Identifying the current frame may include identifying a frame-width, a frame-height, or both. For example, identifying the frame-width, frame-height, or both, may include decoding the frame-width, frame-height, or both from the received encoded video signal such as from a header associated with a frame.

In some implementations a tiling mode may be identified at 1110. For example, identifying a tiling mode may include decoding the tiling mode from the received video stream. A frame may be column-tile, row-tiled or row-and-column-tiled. Column-tiling may increase error resilience and parallelism, and may lower memory utilization. Row-tiling increase error resilience and may reduce latency. Row-and-column tiling may increase error resilience and parallelism, and may reduce memory utilization and latency.

In some implementations, a tile-width may be identified at 1120. For example, the tiling mode may be column-tiled or row-and-column-tiled and a tile-width may be identified. Identifying the tile-width may include decoding the tile-width from the encoded video signal.

In some implementations, a tile-height may be identified at 1122. For example, the tiling mode may be row-tiled or row-and-column-tiled and a tile-height may be identified. Identifying the tile-height may include decoding the tile-height from the encoded video signal. Row-tiled tiles may be decoded sequentially (in order) and may not be independent.

In some implementations, a tile may be decoded at 1130. Decoding a tile may be similar to the decoding shown in FIG. 5, and may include entropy decoding, dequantization, inverse transformation, prediction, reconstruction, loop filtering, deblocking, or a combination thereof. In some implementations, loop filtering, deblocking filtering, or both may be performed across multiple independent tiles.

In some implementations, a tile, such as a column-tiled tile may be decoded independently. Independently decoding a tile may include decoding the tile without reference to information associated with another tile, or a block or pixel in another tile, of the current frame. For example, a tile may be decoded without reference to intra prediction information or contextual information used to predict properties, such as coding modes or motion vectors, of a block in another tile of the current frame. In some implementations, independently decoding tiles may include treating each tile as an independent image, without sharing information across tile boarders.

In an example, the left-most block of a second tile in a frame may be decoded without reference to information used for decoding the right-most block in a first tile in the frame. The left-most block of the second tile may be in the center of the frame and may be decoded using, for example, horizontal intra prediction, as if the block were at the left edge of a frame, without reference to reconstructed pixel values of the right-most macroblock of the first tile for prediction. In some implementations, two or more tiles, from one or more frames, may be concurrently decoded using multiple decoders, processors, cores, or a combination thereof.

In some implementations, the decoded tile may be output at 1140. For example, the decoded tile may be included in an output video stream which may be stored in a memory, such as the memory 150 shown in FIG. 1, may be sent to a display device for display, or may be stored and sent to a display device. In some implementations, one or more other tiles or frames may be decoded concurrently with outputting the decoded tile. In some implementations, identifying a tile-width at 1120, identifying a tile-height at 1122, decoding a tile at 1130, or a combination thereof, may be performed for each tile in the current frame, and the decoded tiles may be output at 1140.

Decoding using tiling, or any portion thereof, can be implemented in a device, such as the computing and communication devices 100A/100B/100C shown in FIG. 2. For example, a decoder, such as the decoder 500 shown in FIG. 5, can implement decoding using tiling, or any portion thereof, using instruction stored on a tangible, non-transitory, computer readable media, such as memory 150 shown in FIG. 1.

Other implementations of encoding and decoding using tiling as shown in FIGS. 7-11 are available. In implementations, additional elements of encoding and decoding using tiling can be added, certain elements can be combined, and/or certain elements can be removed. For example, in an implementation, encoding using tiling can include an additional element involving determining an encoding mode, the loop filtering can be skipped and/or omitted for one or more blocks and/or frames.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "of" rather than an exclusive "of". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/ processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A non-transitory computer-readable storage medium having stored thereon an encoded bitstream, the encoded bitstream generated by performing operations comprising:
   encoding, by a processor, a video stream including a plurality of frames, wherein encoding the video stream includes:
   identifying a current frame from the plurality of frames, wherein the current frame includes a plurality of blocks, and wherein the current frame has a frame-width indicating a cardinality of horizontally adjacent blocks in the current frame, and a frame-height indicating a cardinality of vertically adjacent blocks in the current frame;
   encoding the current frame by:
      identifying a tile-width for encoding a current tile of the current frame, the tile-width indicating a cardinality of horizontally adjacent blocks in the current tile;
      identifying a tile-height for encoding the current tile of the current frame, the tile-height indicating a cardinality of vertically adjacent block in the current tile; and
      generating an encoded tile by encoding the current tile, such that a row of the current tile includes tile-width horizontally adjacent blocks from the plurality of blocks, and a column of the current tile includes tile-height vertically adjacent blocks from the plurality of blocks; and outputting the encoded tile, wherein outputting the encoded tile includes including an encoded-tile size in the encoded bitstream, the encoded-tile size indicating a cardinality of bytes for including the encoded tile in the encoded bitstream, wherein, in response to a determination that the encoded tile is a last encoded tile in the current frame, omitting including the encoded-tile size in the encoded bitstream.

2. The non-transitory computer-readable storage medium of claim 1, wherein outputting the encoded tile includes:

including the encoded tile in the encoded bitstream as an array of bytes.

3. The non-transitory computer-readable storage medium of claim 2, wherein outputting the encoded tile includes:

including the encoded-tile size in a header for the encoded tile.

4. The non-transitory computer-readable storage medium of claim 1, wherein encoding the current tile includes independently encoding the current tile, wherein independently encoding the current tile includes encoding the current tile without reference to information associated with another tile in the current frame.

5. The non-transitory computer-readable storage medium of claim 4, wherein independently encoding the current tile includes independently encoding a plurality of tiles concurrently using parallel processing, the plurality of tiles including the current tile.

6. The non-transitory computer-readable storage medium of claim 1, wherein each block from the plurality of blocks includes a respective plurality of pixels, such that a block from the plurality of blocks has a block-width indicating a cardinality of horizontally adjacent pixels in the block, and a block-height indicating a cardinality of vertically adjacent pixels in the block, and wherein a sum of the tile-width multiplied by the block-width is a multiple of a superblock size.

7. The non-transitory computer-readable storage medium of claim 1, wherein the encoded tile data for the encoded block includes encoded block data for a block that has a block-width indicating a cardinality of horizontally adjacent pixels in the block, wherein a sum of a tile-width, indicating a cardinality of horizontally adjacent blocks in the encoded tile, multiplied by the block-width is a multiple of a superblock size.

8. A non-transitory computer-readable storage medium having stored thereon an encoded bitstream, the encoded bitstream generated by performing operations comprising:

generating the encoded bitstream by encoding a video stream including a plurality of frames, wherein generating the encoded bitstream includes:

identifying a current frame from the plurality of frames, wherein the current frame includes a plurality of blocks, and wherein the current frame has a frame-width indicating a cardinality of horizontally adjacent blocks in the current frame, and a frame-height indicating a cardinality of vertically adjacent blocks in the current frame; and encoding the current frame as a plurality of tiles, wherein each tile in the plurality of tiles includes a respective set of blocks from the plurality of blocks, by encoding each tile from the plurality of tiles, wherein encoding each tile from the plurality of tiles includes:

compressing the tile into an encoded bitstream as an array of bytes; and including an encoded-tile size value in the encoded bitstream, the encoded-tile size value indicating a cardinality of bytes for the array of bytes in the encoded bitstream, wherein, in response to a determination that a tile from the plurality of tiles is a last tile in the current frame, omitting including the encoded-tile size in the encoded bitstream; and transmitting or storing the encoded bitstream.

9. The non-transitory computer-readable storage medium of claim 8, wherein including the encoded-tile size value in the encoded bitstream includes:

including the encoded-tile size in a header for the tile in the encoded bitstream.

10. The non-transitory computer-readable storage medium of claim 8, wherein encoding each tile from the plurality of tiles includes independently encoding at least two tiles from the plurality of tiles concurrently using parallel processing.

* * * * *